United States Patent
Weyer et al.

(10) Patent No.: US 10,418,770 B2
(45) Date of Patent: Sep. 17, 2019

(54) MULTI-DIRECTIONAL HIGH CURRENT SLIP RING

(71) Applicant: BAE Systems Land & Armaments L.P., Arlington, VA (US)

(72) Inventors: Brent J. Weyer, Champlin, MN (US); Jeffrey F. Kezar, Anoka, MN (US)

(73) Assignee: BAE Systems Land & Armaments L.P., Arlington, VA (US)

( * ) Notice: Subject to any disclaimer, the term of this patent is extended or adjusted under 35 U.S.C. 154(b) by 132 days.

(21) Appl. No.: 15/610,024

(22) Filed: May 31, 2017

(65) Prior Publication Data

US 2017/0365968 A1   Dec. 21, 2017

Related U.S. Application Data

(60) Provisional application No. 62/343,472, filed on May 31, 2016, provisional application No. 62/364,520, filed on Jul. 20, 2016.

(51) Int. Cl.

| | |
|---|---|
| *H01R 39/08* | (2006.01) |
| *H01R 39/24* | (2006.01) |
| *H01R 39/34* | (2006.01) |
| *H01R 39/39* | (2006.01) |
| *H01R 39/38* | (2006.01) |
| *H01R 39/12* | (2006.01) |

(Continued)

(52) U.S. Cl.
CPC .............. *H01R 39/24* (2013.01); *H01R 39/08* (2013.01); *H01R 39/12* (2013.01); *H01R 39/385* (2013.01); *H01R 39/39* (2013.01); *H01R 39/64* (2013.01); *H02K 31/02* (2013.01)

(58) Field of Classification Search
CPC ........ H01R 39/04; H01R 39/06; H01R 39/08; H01R 39/085; H01R 39/10; H01R 39/12; H01R 39/14; H01R 39/18; H01R 39/24; H01R 39/26; H01R 39/38; H01R 39/381; H01R 39/383; H01R 39/385; H01R 39/39; H01R 39/40; H01R 39/41; H01R 39/415; H01R 39/42; H01R 39/4464; H02K 31/00; H02K 31/02; H02K 13/003; H02K 13/006
USPC .............. 439/7, 13–28; 310/232–247; 29/597
See application file for complete search history.

(56) References Cited

U.S. PATENT DOCUMENTS

| | | |
|---|---|---|
| 3,423,715 A | 1/1969 | Drescher |
| 3,648,088 A | 3/1972 | Wilkin et al. |

(Continued)

FOREIGN PATENT DOCUMENTS

| | | |
|---|---|---|
| GB | 1325434 | 8/1973 |
| GB | 1326731 | 8/1973 |

(Continued)

*Primary Examiner* — Edwin A. Leon
*Assistant Examiner* — Milagros Jeancharles
(74) *Attorney, Agent, or Firm* — Patterson Thuente Pedersen, P.A.

(57) ABSTRACT

The present invention is an electrical slip ring device comprised of a stator, a rotor and an independent rotationally free brush ring. The brush ring may include a multitude of slipping fingers, chevrons or other current carrying structures that extend between the rotor and the stator. These current carrying structures have a directional bias or "lay". The rotational freedom of the brush ring enables bi-directional movement of the rotor with reduced torque and wear at the sliding interfaces because sliding always occurs in the direction of the lay.

13 Claims, 12 Drawing Sheets

(51) Int. Cl.
*H02K 31/02* (2006.01)
*H01R 39/64* (2006.01)

(56) References Cited

U.S. PATENT DOCUMENTS

| | | | |
|---|---|---|---|
| 3,668,451 A | 6/1972 | McNab | |
| 3,681,633 A | 8/1972 | McNab | |
| 3,796,900 A | 3/1974 | McNab | |
| 3,821,024 A | 6/1974 | Wilkin et al. | |
| 4,186,321 A * | 1/1980 | Marshall | H01R 39/30 310/178 |
| 4,277,708 A | 7/1981 | McNab et al. | |
| 4,314,171 A * | 2/1982 | Hatch | H02K 31/04 310/112 |
| 4,314,172 A | 2/1982 | Diepers | |
| 4,358,699 A * | 11/1982 | Wilsdorf | H01R 39/24 310/251 |
| 5,114,159 A * | 5/1992 | Baird | F01D 5/10 277/355 |
| 5,769,604 A * | 6/1998 | Gardner | F16J 15/3412 277/306 |
| 6,669,202 B1 * | 12/2003 | Aksit | F16J 15/3288 277/355 |
| 6,685,190 B1 * | 2/2004 | Mayer | F16J 15/3288 277/355 |
| 6,903,484 B1 | 6/2005 | Kuhlmann-Wilsdorf | |
| 7,093,835 B2 * | 8/2006 | Addis | F01D 11/005 277/355 |
| 7,105,983 B2 * | 9/2006 | Day | H01R 39/24 310/238 |
| 8,066,286 B2 * | 11/2011 | Neef | F01D 11/001 277/355 |
| 8,366,115 B2 * | 2/2013 | Addis | F16J 15/3288 277/355 |
| 2002/0190473 A1 * | 12/2002 | Tong | F16J 15/3288 277/355 |
| 2004/0100033 A1 * | 5/2004 | Tong | F16J 15/061 277/411 |
| 2007/0152533 A1 * | 7/2007 | Hsu | H01R 39/20 310/248 |
| 2010/0276890 A1 * | 11/2010 | Neef | F01D 11/001 277/300 |

FOREIGN PATENT DOCUMENTS

| | | |
|---|---|---|
| GB | 1328189 | 8/1973 |
| GB | 1332786 | 10/1973 |
| GB | 1337591 | 11/1973 |
| GB | 1388123 | 3/1975 |

* cited by examiner

FIG. 4A
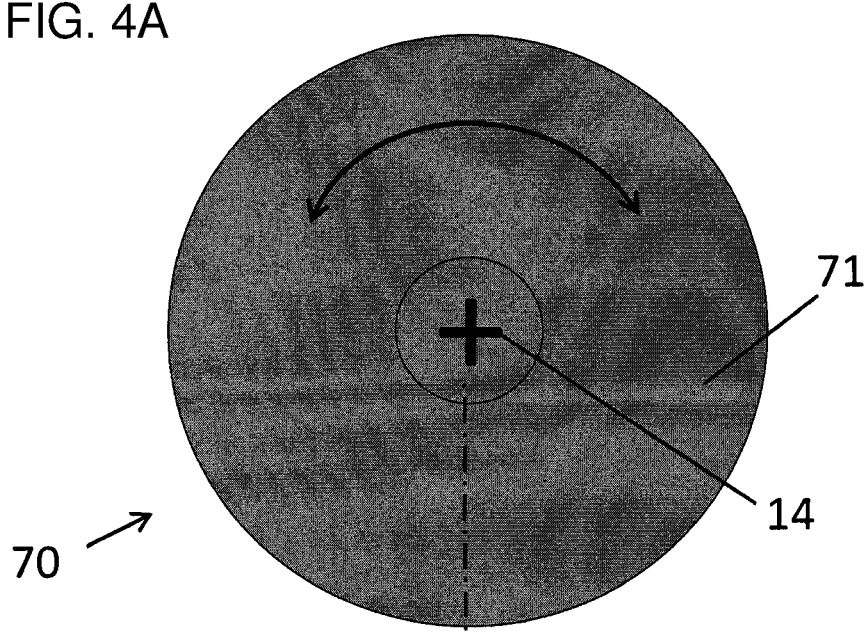
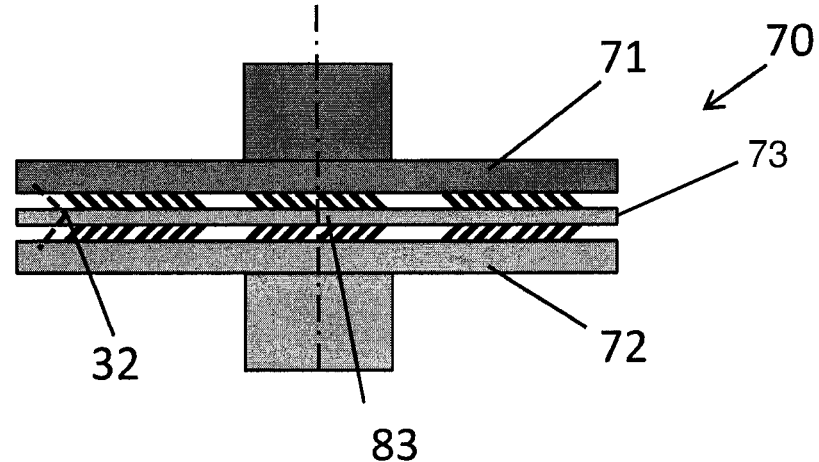
FIG. 4B

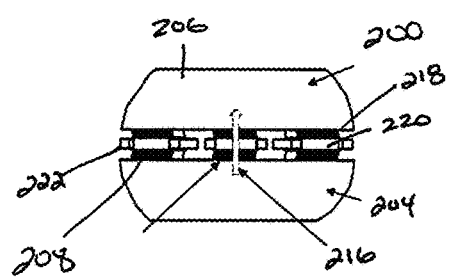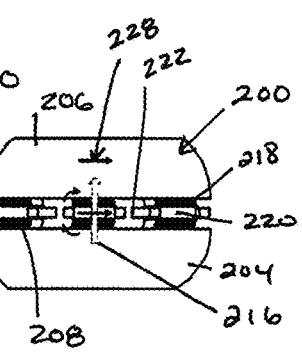
FIG. 16A    FIG. 16B    FIG. 16C

MULTI-DIRECTIONAL HIGH CURRENT SLIP RING

RELATED APPLICATION

The present application claims the benefit of U.S. Provisional Application No. 62/343,472, filed May 31, 2016, and U.S. Provisional Application No. 62/364,520 filed Jul. 20, 2016 both of which are hereby incorporated herein in their entirety by reference.

TECHNICAL FIELD

This invention relates generally to a slip ring device. More specifically, the slip ring is characterized by having a brush element that is independent of both the rotor and the stator elements of the slip ring.

BACKGROUND OF THE INVENTION

At the most basic level, slip rings comprise a conducting ring and a conducting brush. The ring and the brush are commonly incorporated onto rotor and stator structures to facilitate the intended rotational motion between the contacts. Slip rings are often integral to, or systematically incorporated with, electro-dynamic machines including heteropolar or homopolar electric motors and dynamos. In an electric motor or dynamo application, the slip ring provides electric current conduction to and from the machine's rotor as required to induce electromotive force to cause rotation of the rotor. Slip rings are also commonly used to provide electrical current to rotating machinery based systems, wherein the rotating element necessarily requires electrical power during rotation, i.e. rotating tanks, rotating weapon systems, rotating power shovels, etc. Whether the slip ring is used in a motor/generator or in a track type application, the current carrying requirements vary depending on use, and those requirements then drive a variety of slip ring designs.

With respect to the current invention, slip ring designs can generally be broken down into two groupings; low-current slip rings and high-current slip rings. Low-current slip rings are considered slip rings that can transmit milli-Amp current levels up to hundreds or even thousands of Amps. Low-current slip rings often have the ability to transfer current bi-directionally—i.e. clockwise and counter-clockwise rotation—while passing current, and are typically used for data and low power transfer. The brush elements that conduct the current are typically made from graphite blocks or cantilevered metallic "spring fingers" made from precious metals. The bi-directional capability is derived from a slip ring design comprising a cantilevered "spring finger" that lies across the ring tangentially as opposed to terminating at the ring. This configuration allows ring rotation in both directions due to appropriate lead-in angle present in both directions.

As the increase in current requires, available brush designs become limited. Because contact surface area requirements must meet these current requirements, single point or single line contact surface areas do not suffice for higher current requirements. The low current bi-directional slip ring incorporating tangential contact presents either point or line contact depending on the cross section of the spring finger. Accordingly, while allowing bi-directionality, this configuration limits the current transfer capability due to its limited contact geometry.

To accommodate higher current loads, brush geometry requires higher contact surface area than can be provided by the aforementioned tangential contact. A common approach is to align a plurality of "spring fingers" in a bank array, each of which terminates at the ring. These "spring fingers" are beam structures that are oriented perpendicular to the axis of rotation, and therefore parallel to the direction of surface motion, but are biased at an angle to the surface of the rotor or stator, as opposed to terminating orthogonally to the axis of rotation. The acute angle created between the "spring finger" and the surface of the rotor or stator is the lead-in angle. This brush element configuration allows for contact surface area that would be physically or economically infeasible for the aforementioned tangential contact arrangement. However, this configuration loses its inherent bi-directional capability because the terminal-end designs logically have only one lead-in angle as opposed to two.

Specifically, high-current brush elements are often comprised of either laminated metallic foil rings that are louvered in an array formation or individual "spring fingers" stamped from chosen brush material and bound in an array formation. The tips of louvers or the chevron stamping then terminate at the ring. High-current slip rings, configured in this manner, can transmit from hundreds of thousands to millions of Amps, but enable only one direction of motion while passing current. For this reason, high-current slip rings have primarily been used in experimental homopolar motors and generators. There is limited data on what happens when the rotor rotates opposite the lay of the brush elements—i.e. in the direction not having a lead-in angle—but it is assumed this would result in excessive friction, wear, and binding as the system more closely resembles a locked ratchet clutch.

To attain bi-directionality, a common solution has been to eliminate the lead-in angle and arrange the brush elements such that the beam section of each "spring finger" is in a parallel plane to the axis of rotation, which is then perpendicular to the direction of rotor or stator surface motion. In other words, the brush elements are arranged such that they have no bias towards motion and therefore have no lead-in angle. This configuration produces a brush element in which each "spring finger" is subject to cantilever beam forces and accompanying motion in both directions. Such bidirectional forces and motion decrease the life of the brush elements due to increased fatigue stress. Further, friction forces may spike when a change of direction takes place because the "spring fingers" must shift from accommodating motion in one direction to accommodating motion in the other. Thus, there is a prevalent lack of technology in the slip ring industry adequately addressing both mega-amp current requirements as well as bi-directionality.

SUMMARY OF THE INVENTION

In order to attain mega-amp current requirements in a bi-directional slip ring, an independent brush element can be used. While a tangential contact brush approach cannot meet current requirements, but terminal end "spring fingers" in an array can, a solution is to affix a terminal end "spring finger" array to either side of an independent structure that rotates freely between the rotor and stator structures. The inside brush element is arranged in such a way that it allows motion in one direction, while the outside brush element allows motion in the opposite direction. Accordingly, the independent brush slip ring approach enables very high current transfer capability in conjunction with bi-directional operation by allowing the brush modules to always operate in a mechanically favorable orientation, regardless if it is clockwise or counter-clockwise.

The independent brush slip ring is generally comprised of stator and rotor components and an independent brush ring. The brush ring comprises conductive brush elements that may be bi-directional louvered metallic foils or banks of stamped and bound bi-directional "spring fingers". The independent brush ring maintains intimate contact of prescribed force to both rotor and stator serving to transfer current between the two.

When the rotor experiences clockwise rotation, the brush ring will affix to either the rotor or stator, whichever is in contact with brush elements that are biased against the motion, and then allow motion between the counterpart component and the counterpart brush elements that are biased for motion. When rotor experiences counterclockwise rotation, the brush ring will affix to, or allow motion with, the opposite component than that of clockwise rotation.

The present invention is an electrical slip ring device comprised of a stator, a rotor and an independent rotationally free brush ring. The brush ring may include a multitude of slipping fingers, chevrons or other current carrying structures that extend between the rotor and the stator. These current carrying structures have a directional bias or "lay". The rotational freedom of the brush ring enables bi-directional movement of the rotor with reduced torque and wear at the sliding interfaces because sliding always occurs in the direction of the lay.

The present invention is a high-current bi-directional slip ring comprising; a rotor assembly; a stator assembly; and an independent brush ring assembly, said brush ring assembly including a brush ring support structure for maintaining a plurality of brushes in alignment with the rotor assembly and the stator assembly, the brushes having a lay that promotes movement of the brush ring assembly independent of the rotor and the stator. The slip ring further including a brush mount to which the plurality of brushes are attached, said brush mount including a mounting pin for connecting the brushes to the brush ring support structure. The plurality of brushes may be in a chevron design, a multilam structure in a louvered orientation.

The high-current bi-directional slip ring may be in a drum arrangement or a pancake arrangement. The mounting of the brushes may be in a circumferential orientation relative to the stator and rotor or in a radial alignment The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 4A is a top-view of a disc-type high current bi-directional slip ring.

FIG. 4B is a landscape view of a disc-type high current bi-directional slip ring.

FIG. 16A is a cross sectional view of the brush module of FIG. 13 for No Motion of the rotor.

FIG. 16B is a cross sectional view of the brush module of FIG. 13 for Clockwise Motion of the rotor.

FIG. 16C is a cross sectional view of the brush module of FIG. 13 for Counterclockwise motion of the rotor.

Figure 1:
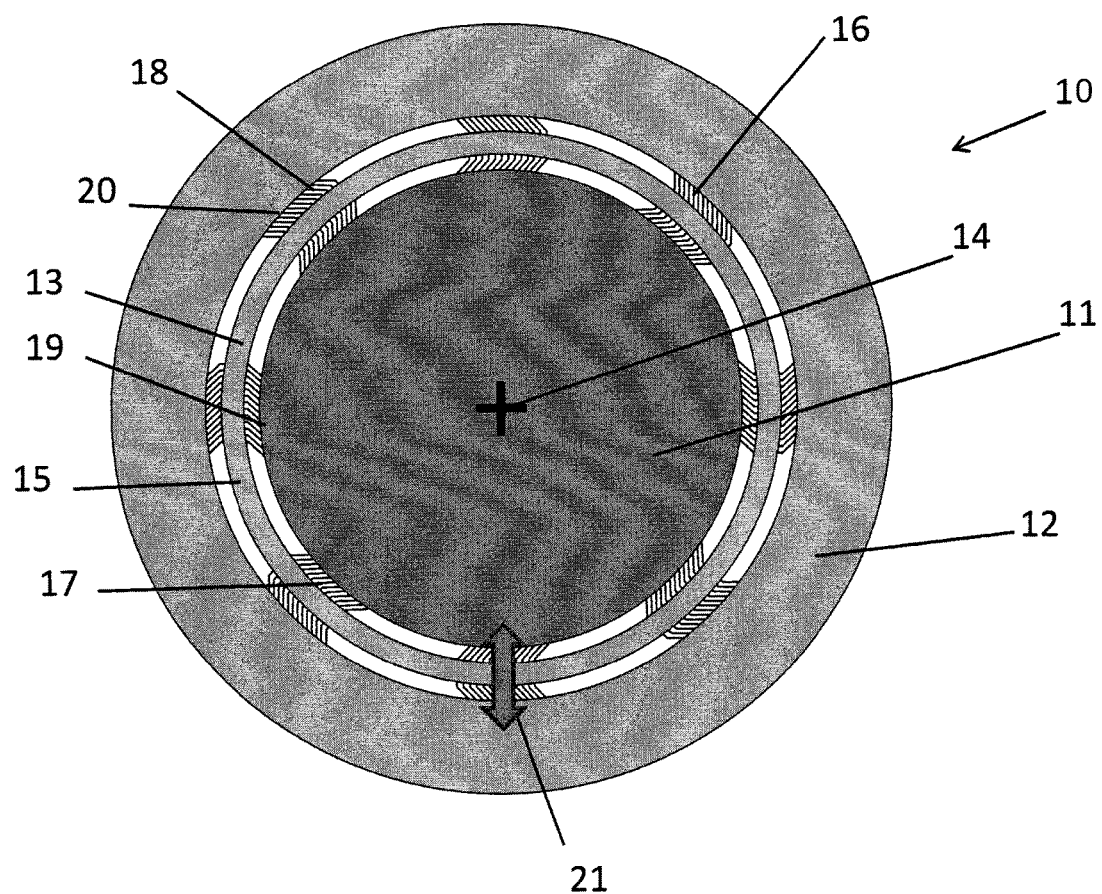
FIG. 1 is a cross-sectional end view of a high current bi-directional slip ring.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

One embodiment of a high current bi-directional slip ring 10, shown in FIG. 1, comprises a rotor 11, a stator 12 and an independent brush element 13. The rotor 11 rotates about a rotational axis 14. In this embodiment, the independent brush element 13 contains a ring structure 15, which holds and aligns multiple brush arrays 15. The brush arrays 16 are comprised of an inner brush array 17 and an outer brush array 18. In this embodiment the inner brush array 17 terminates at the rotor 11 at a rotor-ring interface 19. In this embodiment the outer brush array 18 terminates at the stator 12 at a stator-ring interface 20. The rotor-ring interface 19 and the stator-ring interface 20 are a ratcheting contact points that allow motion in one direction but not in the other. Current flow 21 flows from the stator 12, across the stator-ring interface 20, through the outer brush array 18, through the ring structure 15, through the inner brush array 17, across the rotor-ring interface 19 and finally to the rotor 11.

Figure 2A:
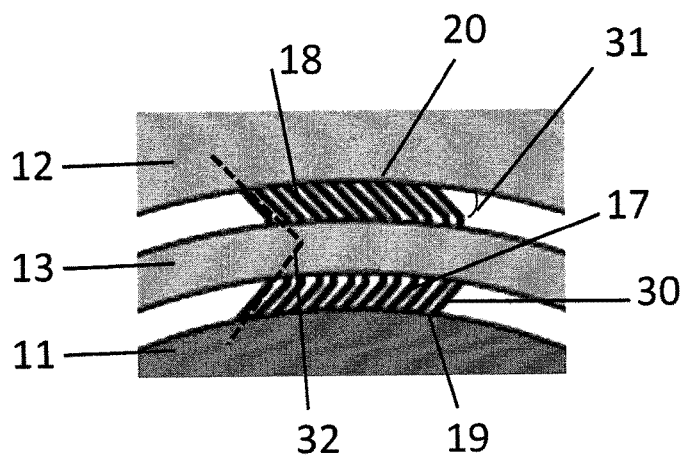
FIG. 2A is a close up of the cross-sectional view of a high current bi-directional slip ring.

FIG. 2A shows a close-up view of a section of the independent brush element 13 of FIG. 1. FIG. 2A shows that the independent brush element 13 comprises the inner brush array 17 and the outer brush array 18 which further comprise individual spring fingers 30. The spring fingers 30 are arranged such that they terminate at either the rotor-ring interface 19 or the stator-ring interface 20 at a spring finger bias angle 31. The spring finger bias angle 31 allows for a lead-in angle that is acute, rather than perpendicular or obtuse. This embodiment utilizes a chevron element 32, where a single stamped part comprises an individual spring finger 30 that is part of the outer brush array 18 and its counterpart individual spring finger 30 that is part of the inner brush array 17. The chevron elements 32 are then bound together such that both inner brush array 17 and outer brush array 18 are formed and then fixed to the ring structure 15. Once the necessary number of brush arrays 16 is fixed to the ring structure 15 to accommodate the current load, the independent brush element is complete.

Figure 2B:
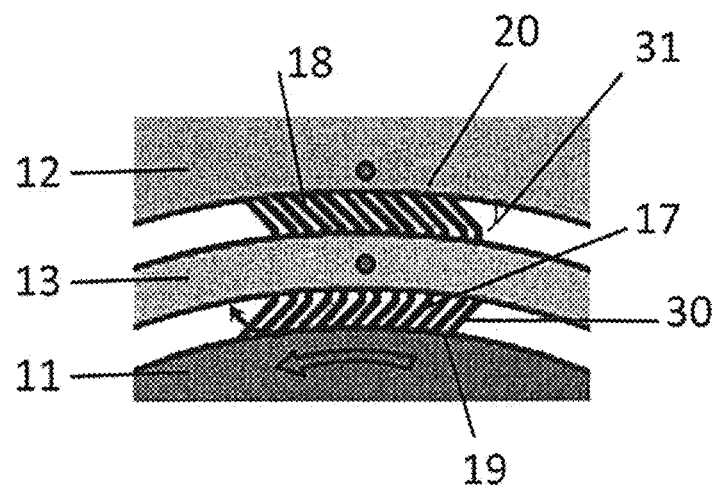
FIG. 2B is a close up of the cross-sectional view of a high current bi-directional slip ring wherein the rotor is spinning counter-clockwise.

When the rotor 11 is rotating counter clockwise in this embodiment as it is in FIG. 2B, the independent brush element 13 remains stationary with respect to the stator 12 but allows motion at the rotor-ring interface 19. This is because the spring finger bias angle 31 of the spring fingers 30 of the inner brush array 17 is at an acute lead-in angle, allowing the proper spring finger 30 deflection needed for motion, while the spring finger bias angle 31 of the spring fingers 30 of the outer brush array 18 is at obtuse lead-in angle effectively locking the independent brush element 13 to the stator 12.

Figure 2C:
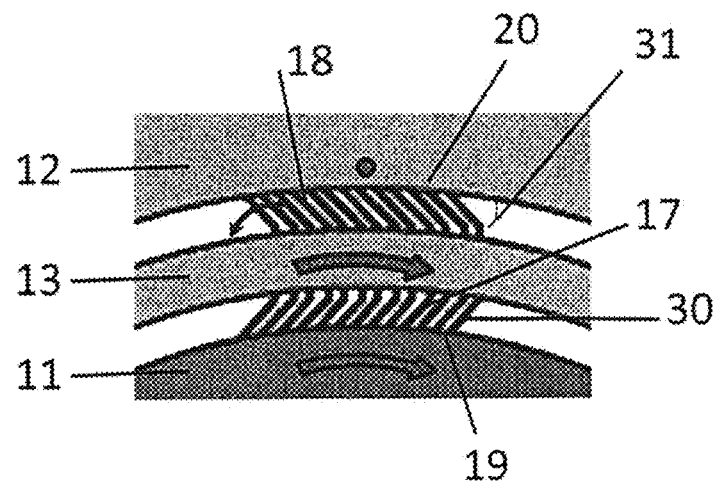
FIG. 2C is a close up of the cross-sectional view of a high current bi-directional slip ring in which the rotor is spinning in a clockwise motion.

Similarly, when the rotor 11 is rotating clockwise in this embodiment as it is in FIG. 2C, the independent brush element 13 remains stationary with respect to the rotor 11 but allows motion at the stator-ring interface 20. This is because the spring finger bias angle 31 of the spring fingers 30 of the outer brush array 18 is at an acute lead-in angle allowing the proper spring finger 30 deflection needed for motion while the spring finger bias angle 31 of the spring fingers 30 of the inner brush array 17 is at obtuse lead-in angle effectively locking the independent brush element 13 to the rotor 11.

Figure 3:
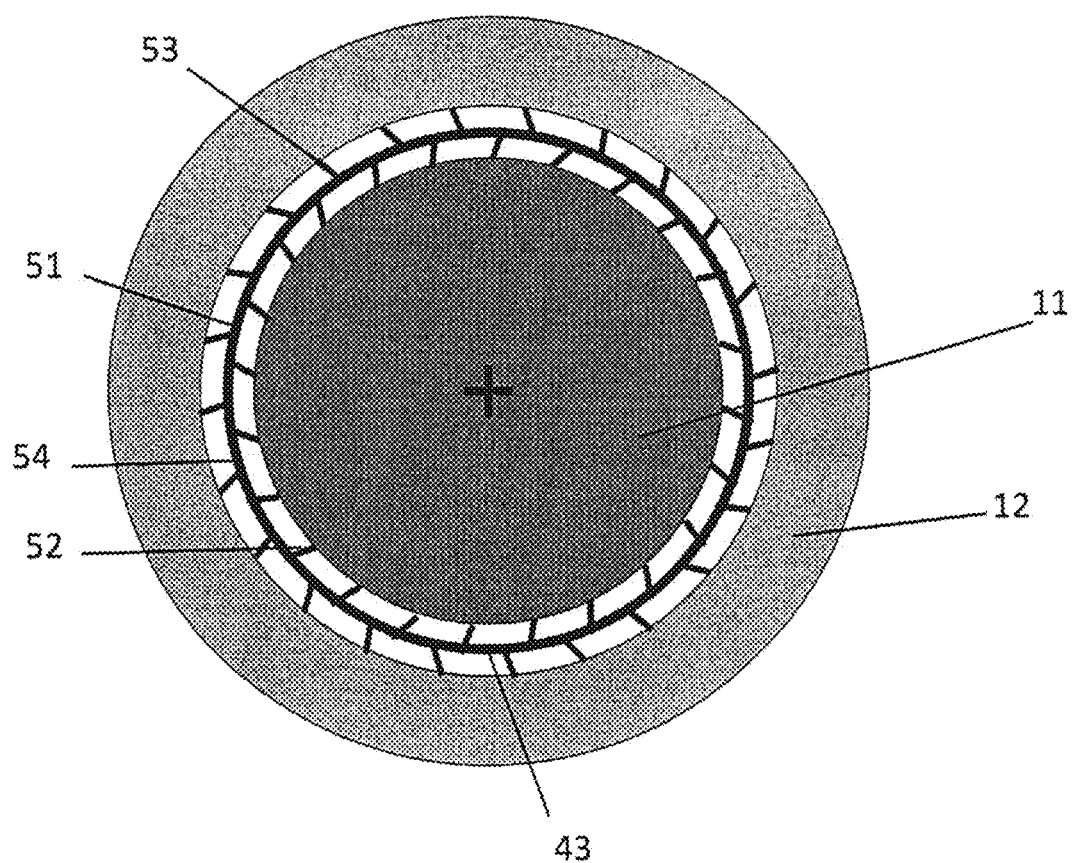
FIG. 3 is a cross-sectional view of a high current bi-directional slip ring using multi-laminate material as an independent brush element.

In another embodiment shown in FIG. 3, an independent brush element 43 is produced using a multi-laminate conductive foil 51 that is stamped or pressed such that inner louvers 52 and outer louvers 53 protrude from either side of the centerline of the multi-laminate conductive foil 51. When multi-laminate conductive foil 51 is butted end to end to create a loop, the multi-laminate conductive foil 51 creates an integral independent brush element 54. The integral independent brush element 54 operates similarly to the independent brush element 43 in that rotational motion in one direction fixes the integral independent brush element 54 to the stator 12 and accordingly, when the rotational motion is reversed, the integral independent brush element 54 fixes to the rotor 11. This embodiment likely exhibits a difference in price due to the drastically different manufacturing methods, but at the expense of an altered current load capacity or other performance factor.

In another embodiment, shown in FIGS. 4A and 4B and FIGS. 5A and 5B, a high-current bi-directional disc slip ring 70 operates similarly to the high-current bi-directional slip ring 10 mentioned above but instead of a rotor 11, stator 12, and independent brush element 13 being concentrically cylindrical with the cylindrical walls also being the electrical contact surfaces, the high-current bi-directional disc slip ring 70 utilizes a disc rotor 71, a disc stator 72, and a disc independent brush element 73 and utilizes a contact surface plane that is orthogonal to the rotational axis 14.

The functional relationship of the disc rotor 71, disc stator 72, and disc independent brush element 73, however, is identical to the rotor 11, stator 12, and the independent brush element 13 of the high-current bi-directional slip ring 10 in that rotational motion in one direction fixes the disc independent brush element 73 to the disc stator 72 and accordingly, when the rotational motion is reversed, the disc independent brush element 73 fixes to the disc rotor 71.

Figures 5A, 5B:
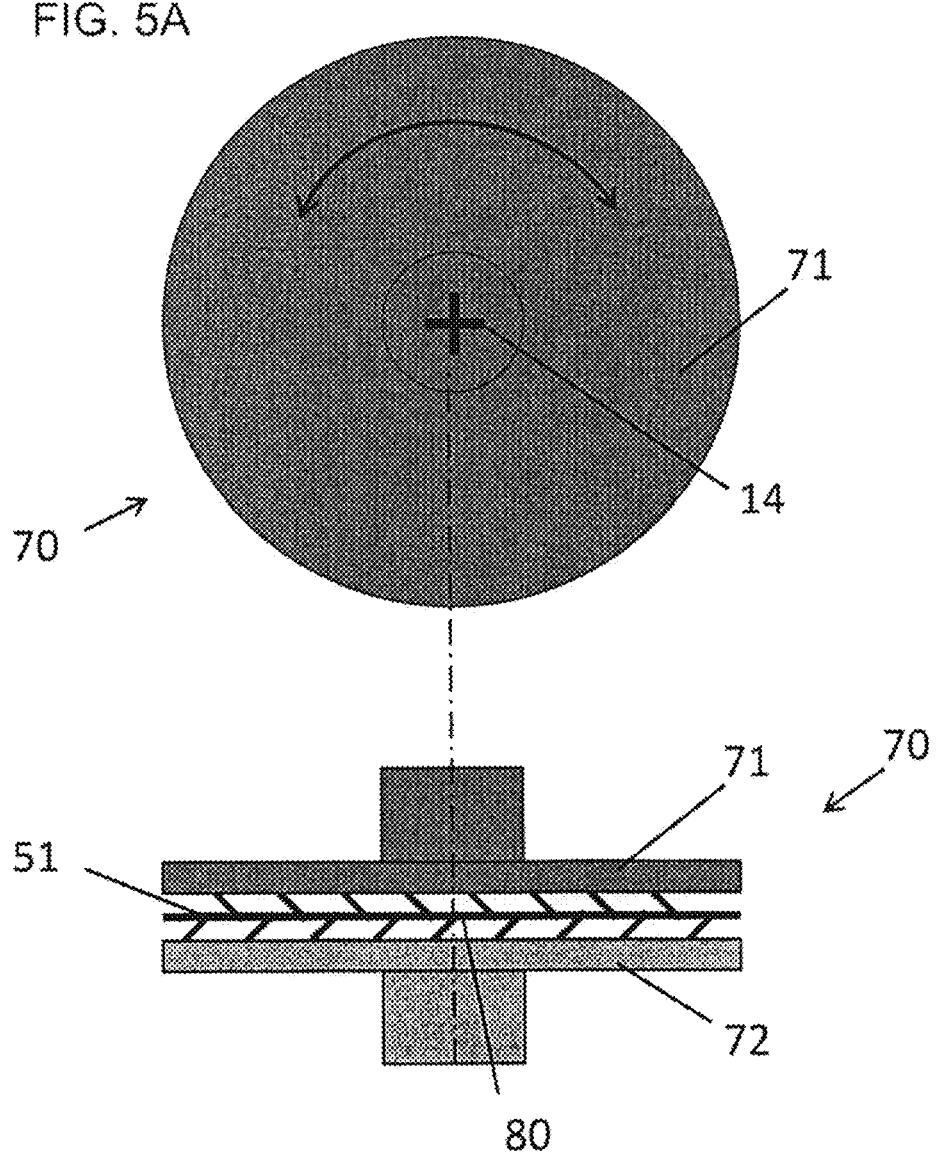
FIG. 5A is a top-view of a disc-type high current bi-directional slip ring.
FIG. 5B is a landscape view of a disc-type high current bi-directional slip ring using multi-laminate material as an independent brush element.

As an alternative to a disc independent brush element 73, which utilizes brush arrays 16 comprising bound chevron elements 32, as shown in FIGS. 4A and 4B, a multi-laminate conductive foil 51 could be used to create an integral disc independent brush element 80 as shown in FIGS. 5a and 5b. Analogous to the integral independent brush element 54 of the cylinder-based high-current bi-directional slip ring 10, the integral disc independent brush element 80 provides an alternative to the disc independent brush element 73 for the high-current bi-directional disc slip ring 70 to address different cost and performance requirements.

In other embodiments, both high-current bi-directional slip ring 10 and high-current bi-directional disc slip ring 70 could be fitted with unidirectional locking mechanisms, such as a locking ratchet mechanism, that could either provide all of, assist with, or provide back-up for the fixation needed when the rotational motion is adverse to the spring finger bias angle 31 at the rotor-ring interface 19 or the stator-ring interface 20.

FIGS. 6-16 depict two embodiments of the invention as described above. FIGS. 6-12C depict details of a high-current slip ring with travelling brush ring drum arrangement. FIGS. 13-16 depict a high current slip ring with a travelling brush ring in a pancake arrangement.

Figure 6:
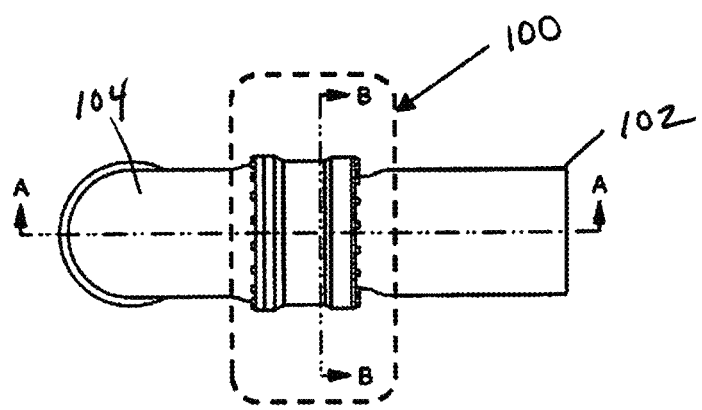
FIG. 6 is a plan view of a drum style slip ring installation.

In FIG. 6, slip ring section 100 is disposed between a shaft 102 and a fitting 104. FIG. 6 is an embodiment of a high-current slip ring with a travelling brush ring in a drum arrangement.

Figure 7:
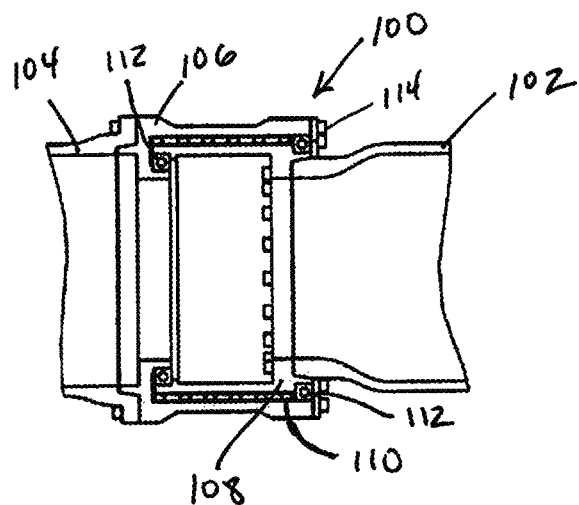
FIG. 7 is a slip ring section at A-A from FIG. 6.

FIG. 7 is a cut away expanded view of the slip ring section 100. The brush ring assembly 110 is disposed between rotor 108 and stator 106. Bearings 112 are disposed about the interface between stator 106 an rotor 108. A plurality of fasteners 114 connects the elements together.

Figure 8:
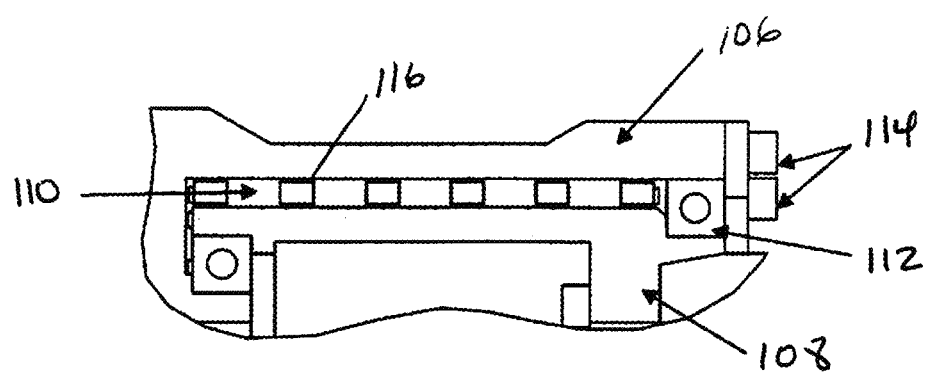
FIG. 8 is a slip ring section at B-B from FIG. 6.

FIG. 8 is a cut away view of FIG. 7. The brush ring assembly 110 is disposed between rotor 108 and stator 106. The brush ring assembly 110 may be disposed within a channel 111. Bearings 112 are disposed about the interface between stator 106 and rotor 108. Brush module 116 is located within the brush ring 110.

Figure 9:
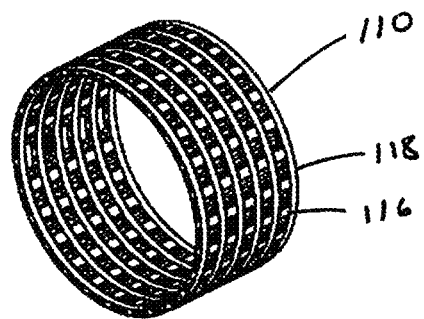
FIG. 9 is a perspective view of the brush ring assembly.

FIG. 9 is a perspective view of the brush ring 110. A series of radial parallel ring supports 118 are connected axially by the brush modules 116. In the embodiment of FIG. 9 there are six ring supports 118 with five brush modules 116 equally spaced axially across the brush ring assembly 110.

Figure 10:
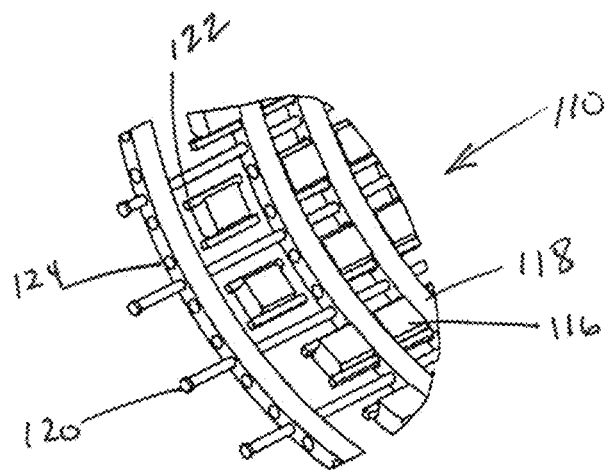
FIG. 10 is a perspective view of the brush ring assembly detail.

FIG. 10 is a cut away view of FIG. 9. The brush ring assembly 110 includes radial ring supports 118, axial ring supports 120 and brush modules 116. As illustrated in FIG. 10, the axial ring supports 120 extend through the radial ring supports 118. The brush modules 116 further include mounting pins 122 at the four corners of the module. The pins 122 are sized to mate with mounting holes 124 in the radial ring support 118.

Figure 11A:
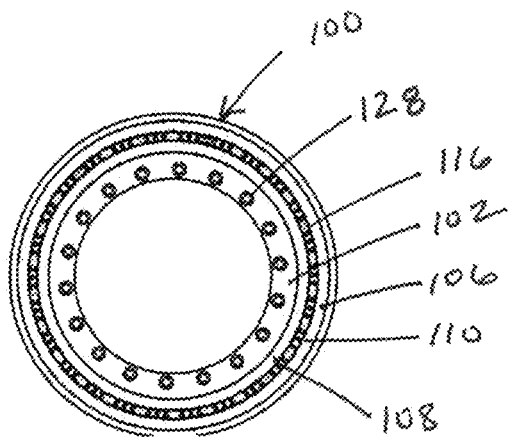
FIG. 11A is a plan view of a travelling brush ring drum arrangement
Figures 11B, 11C:
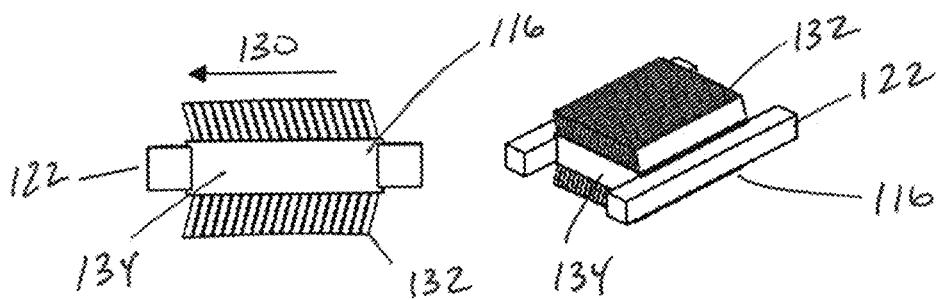
FIG. 11B is a plan view of the brush detail of FIG. 11A.
FIG. 11C is a perspective view of the brush detail of FIG. 11A

FIG. 11B is a cross sectional view of brush module 116 and FIG. 11C is a perspective view. Arrow 130 depicts the direction of the brush lay. The brush module 116 is made up of a plurality of individual brushes 132 and a brush mount 134. Mounting pins 122 extend from brush mount 134. The brushes 132 extend distally from the upper face and lower face of brush mount 134.

Figures 12A, 12B, 12C:
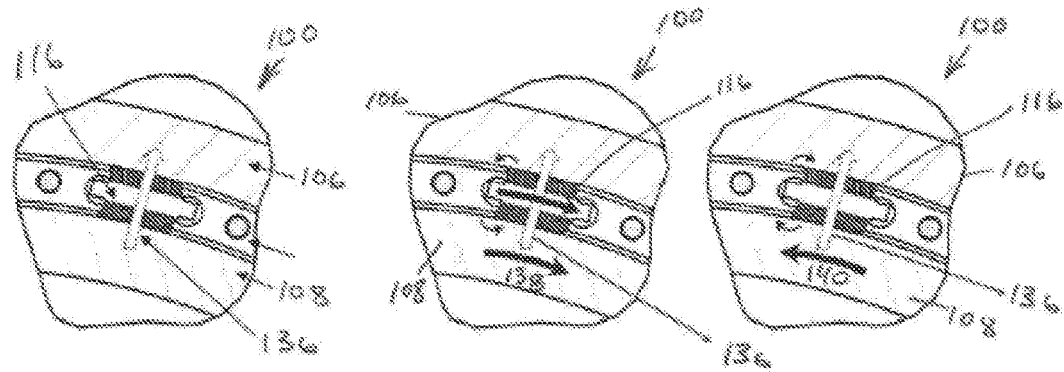
FIG. 12A is a cross sectional view of the brush module of FIG. 6 for No Motion of the rotor.
FIG. 12B is a cross sectional view of the brush module of FIG. 6 for Clockwise Motion of the rotor.
FIG. 12C is a cross sectional view of the brush module of FIG. 6 for Counterclockwise motion of the rotor.

FIGS. 12A-C depict the slip ring 100 in operation. FIG. 12A depicts the slip ring 100 with no rotor rotation. Arrow 136 depicts the direction of the electrical current flow from the rotor 108, through the brush ring module 116 to the stator 106.

FIG. 12B depicts the slip ring 110 with clock wise rotation denoted by arrow 138. In this scenario, the brush ring module 116 moves clockwise with the rotor 108 as a result of the brush lay.

FIG. 12C depicts the slip ring 110 with counter clockwise rotation denoted by arrow 140. In this scenario, the brush ring module 116 remains stationary as a result of the brush lay.

FIGS. 13-16C depicts an alternate embodiment of high-current slip ring with a travelling brush ring in a pancake arrangement.

Figure 13:
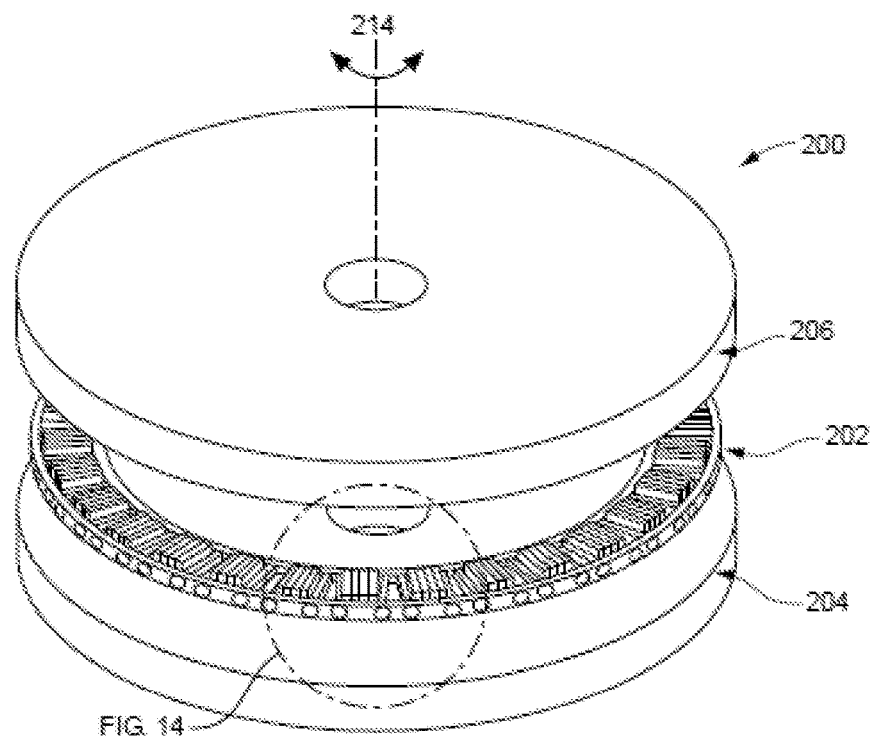
FIG. 13 is a perspective view of travelling brush ring in a pancake arrangement.

FIG. 13 depicts a perspective view of the slip ring assembly 200. Brush ring assembly 202 is disposed between rotor 204 and stator 206.

Figure 14:
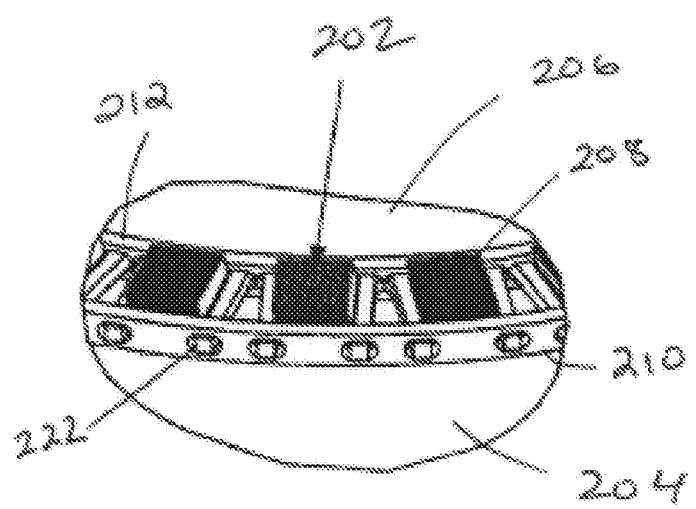
FIG. 14 is a detail perspective view of the Detail E from FIG. 13 showing the brush modules.

FIG. 14 depicts a cut away detail from FIG. 13 of the brush ring assembly 202. As compared to the previous embodiment, brush ring modules 208 are disposed in the same plane as the rotor 204 and stator 206. Brush ring assembly 202 is comprised of a plurality of brush ring modules 208 that are situated between an outer brush ring support 210 and an inner brush ring support 212.

Figure 15:
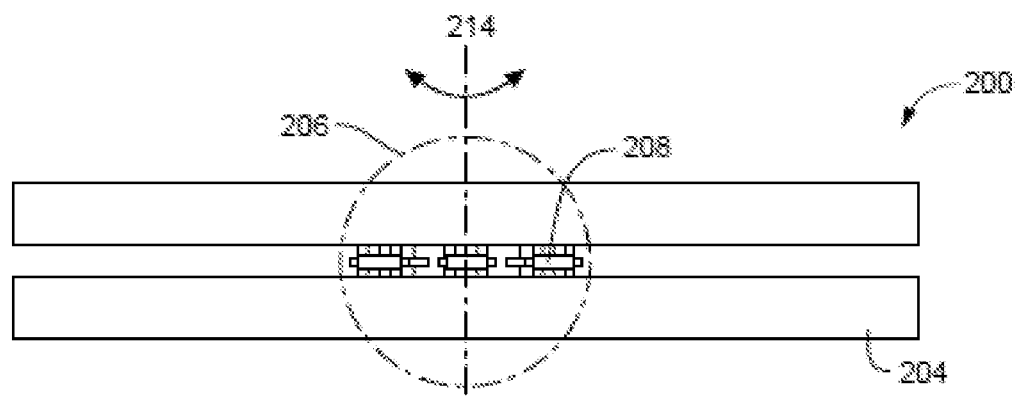
FIG. 15 is a cross sectional view of the pancake arrangement of FIG. 13.

FIG. 15 depicts a side view of the slip ring 200 with only three of the brush ring modules 208. The rotation axis of slip ring 200 is depicted by arrow 214. Slip ring 200 can rotate clockwise or counterclockwise. The brush ring modules 208 are in contact with both the stator 206 and rotor 204.

FIGS. 16A-C depicts the slip ring 200 in operation. FIG. 16A depicts the slip ring 200 with no rotor rotation. Arrow 216 depicts the direction of the electrical current flow from the rotor 204, through the brush ring module 208 to the stator 206. Note that the brush ring module support structure is not shown. The brush ring module 208 is comprised of a plurality of individual brushes 218 and a brush mount 220. Mounting pins 222 extend from brush mount 220. The brushes 218 extend distally from the upper face and lower face of brush mount 220. The individual brushes 218 are slanted to form a brush lay. The brush ring modules 208 also include mounting pins 222 that extend from the center brush mount 220 for engagement with the outer brush ring support 210 and an inner brush ring support 212.

FIG. 16B depicts the slip ring 200 with clock wise rotation of the rotor 204 denoted by arrow 226. In this scenario, the brush ring module 208 moves clockwise with the rotor 204 as a result of the brush lay.

FIG. 16C depicts the slip ring 200 with counter clockwise rotation of the rotor 204 denoted by arrow 228. In this scenario, the brush ring module 208 remains stationary as a result of the brush lay.

Figure 17:
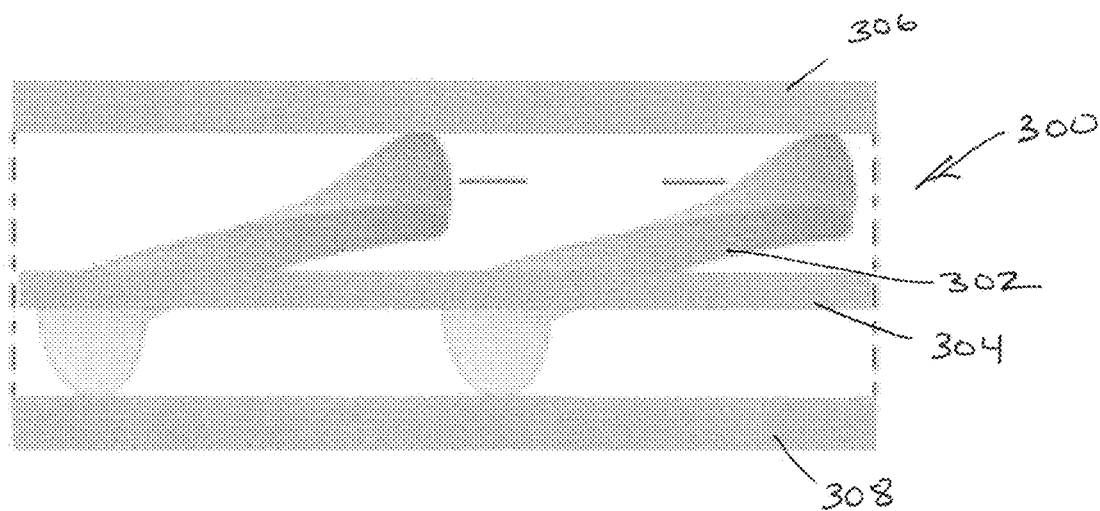
FIG. 17 is a cross sectional view of a multilam louvered brush.

FIG. 17 illustrates a cross sectional view of a brush ring assembly 300 where the brushes 302 are multilam contacts. The brushes 302 are connected by supports 304. The brushes are in contact with a stator 306 and a rotor surface 308.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A high-current bi-directional slip ring comprising; a rotor assembly; a stator assembly; and an independent brush ring assembly, said brush ring assembly including a brush ring support structure for maintaining a plurality of brushes in alignment with the rotor assembly and the stator assembly, the brushes having a lay that promotes movement of the brush ring assembly independent of the rotor and the stator.

2. The high-current bi-directional slip ring of claim 1 further including a brush mount to which the plurality of brushes are attached, said brush mount including a mounting pin for connecting the brushes to the brush ring support structure.

3. The high-current bi-directional slip ring of claim 1 wherein the plurality of brushes is a chevron design.

4. The high-current bi-directional slip ring of claim 1 wherein the plurality of brushes is a multilam structure in a louvered orientation.

5. The high-current bi-directional slip ring of claim 1 wherein the slip ring is in a drum arrangement.

6. The high-current bi-directional slip ring of claim 5 wherein the support structure includes at least two radial ring supports for mounting the brushes in a circumferential orientation relative to the stator and rotor.

7. The high-current bi-directional slip ring of claim 6 wherein the support structure further includes a plurality of axial ring supports that are disposed between brushes and connect with the radial ring supports.

8. The high-current bi-directional slip ring of claim 1 wherein the slip ring is in a pancake orientation.

9. The high-current bi-directional slip ring of claim 5 wherein the support structure includes an inner radial support ring and an outer radial support ring, wherein the inner radial support ring has a smaller diameter than the outer radial support ring.

10. The high-current bi-directional slip ring of claim 9 wherein the brushes are mounted between the inner radial support ring and the outer radial support.

11. The high-current bi-directional slip ring of claim 1 wherein the lay of the brushes promotes the independent brush ring to rotate when the rotor is moving in a clockwise direction.

12. A method for enabling a high electrical current transfer across a rotational axis of motion that alternates between clockwise and counter clockwise operation, the method comprising;
   inserting an independent brush ring assembly between a rotor assembly and a stator assembly;
   mounting a plurality of brushes in alignment with the rotor assembly and the stator assembly on the independent brush ring; and
   angling the brushes to form a lay that promotes movement of the independent brush ring assembly independent of the rotor and the stator.

13. The method of claim 12 wherein the angling of the brushes allows for the brush ring to rotate with the rotor when the lay is more favorable to motion.

* * * * *